United States Patent [19]
Burrows et al.

[11] Patent Number: 5,413,486
[45] Date of Patent: May 9, 1995

[54] INTERACTIVE BOOK

[75] Inventors: Roger I. Burrows, Fairfield; Michael J. Morris, Western, both of Conn.

[73] Assignee: Joshua Morris Publishing, Inc., Wilton, Conn.

[21] Appl. No.: 77,900

[22] Filed: Jun. 18, 1993

[51] Int. Cl.⁶ .............................................. G09B 3/00
[52] U.S. Cl. ............................... 434/317; 434/308; 434/327; 434/335
[58] Field of Search ............. 434/317, 308, 327, 335; 364/410, 419.01

[56] References Cited

U.S. PATENT DOCUMENTS

| | | |
|---|---|---|
| 2,442,447 | 6/1948 | Zadig . |
| 3,522,665 | 8/1970 | Kalt .............................. 434/317 X |
| 3,949,488 | 4/1976 | Welch . |
| 4,216,965 | 8/1980 | Morrison et al. . |
| 4,303,398 | 12/1981 | Yoseloff . |
| 4,355,984 | 10/1982 | Slavik et al. .................... 434/335 |
| 4,403,966 | 9/1983 | Yang . |
| 4,416,182 | 11/1983 | Wise et al. . |
| 4,425,098 | 1/1984 | Döring . |
| 4,465,465 | 8/1984 | Nelson . |
| 4,474,557 | 10/1984 | Clossey . |
| 4,557,694 | 12/1985 | Nelson . |
| 4,636,881 | 1/1987 | Brefka et al. . |
| 4,639,225 | 1/1987 | Washizuka . |
| 4,673,357 | 6/1987 | Ito . |
| 4,682,958 | 7/1987 | Slavik et al. . |
| 4,703,573 | 11/1987 | Montgomery et al. . |
| 4,778,391 | 10/1988 | Weiner . |
| 4,809,246 | 2/1989 | Jeng . |
| 4,855,725 | 8/1989 | Fernandez .................... 434/308 X |
| 4,884,974 | 12/1989 | DeSmet . |
| 4,959,017 | 9/1990 | Thompson et al. . |
| 4,968,255 | 11/1990 | Lee et al. . |
| 4,990,092 | 2/1991 | Cummings . |
| 4,990,093 | 2/1991 | Frazer et al. .................. 434/327 X |
| 4,997,374 | 3/1991 | Simone . |
| 5,030,101 | 7/1991 | Ikemoto et al. . |
| 5,035,625 | 7/1991 | Munson et al. ................ 434/327 X |
| 5,055,053 | 10/1991 | Hyman . |
| 5,059,126 | 10/1991 | Kimball . |
| 5,120,065 | 6/1992 | Driscoll et al. . |
| 5,122,062 | 6/1992 | Cutler et al. . |
| 5,145,447 | 9/1992 | Goldfarb . |
| 5,167,508 | 12/1992 | McTaggart . |
| 5,174,759 | 12/1992 | Preston et al. .................. 434/317 |
| 5,209,665 | 5/1993 | Billings et al. . |

FOREIGN PATENT DOCUMENTS

| | | |
|---|---|---|
| 3140735 | 8/1983 | Germany . |
| 2619717 | 8/1990 | Germany . |
| 59-169897 | 11/1984 | Japan . |
| 62-181979 | 11/1987 | Japan . |
| 2024480 | 1/1980 | United Kingdom . |
| 2108747 | 5/1983 | United Kingdom . |
| 2189742 | 11/1987 | United Kingdom . |
| 2227872 | 2/1989 | United Kingdom . |

OTHER PUBLICATIONS

"Educational Apparatus with Workbooks", IBM Technical Disclosure Bulletin, vol. 11, No. 7, Dec. 1968, pp. 748–749.

User's Manual for Electronic Toy.

Primary Examiner—Richard J. Apley
Assistant Examiner—Glenn E. Richman
Attorney, Agent, or Firm—C. Scott Talbot; Howrey & Simon

[57] ABSTRACT

An interactive book or device having a mechanism for generating a plurality of sensory outputs in manner that maximizes the interaction between the user and the book or device. The interactive book includes function initiators for initiating a unique sensory output that corresponds to a visual indicia on a page of the book. A function level selector is coupled to the function initiators that selectively changes a function level and thereby selectively changes the sensory output corresponding to each function initiator. Consequently, the number of sensory outputs is increased and thereby enables greater interaction between the user and the book. It also encourages the user to creatively combine the sensory outputs to obtain a cognizable aggregate output.

43 Claims, 6 Drawing Sheets

INTERACTIVE BOOK

BACKGROUND OF THE INVENTION

The invention relates generally to interactive books and devices and, more particularly, to interactive books and devices in which sensory outputs are provided for each page of the book or layout of the device.

A book can be more fun as an amusement device and more effective as an educational tool when it has features that not only engage the attention of the user but also encourage the creativity of the user. Books with various interactive features have been proposed in the past. One such book is disclosed in U.S. Pat. No. 4,884,974 to DeSmet. This patent discloses a book usable with an audio player assembly that provides audio outputs relevant to material on the printed page in response to actuation of any of a series of buttons. One button provides an audible reading of the text on the page of the book. Another button provides an audible question pertaining to the information given in the written text. The remaining two buttons provide choices of answers to the question.

Another example of an interactive book is disclosed in U.S. Pat. No. 4,990,092 to Cummings. This patent discloses a book having a series of buttons mounted along the outer edge of the bottom cover. Each button is programmed to provide an audio output relevant to a corresponding page of the book.

Yet another example interactive book is disclosed in U.S. Pat. No. 4,997,374 to Simone. This patent discloses a book device having an audio program source that provides audio outputs either of the text on a particular page of the book or a question pertaining to that text. A user answers any question by actuating any of a plurality of answer buttons.

Other interactive books have been proposed as well. See, for example, U.S. Pat. No. 4,636,881 to Brefka et at., U.S. Pat. No. 4,809,246 to Jeng, U.S. Pat. No. 5,167,508 to McTaggart and PCT Publication No. WO 91/06090 (Billings et at.).

These known interactive books, however, do not provide a mechanism that maximizes the amount of sensory outputs available to the user. Nor do these known books enable creative combination of the sensory outputs by the user. Consequently, the interaction between the user and the book is not as great as it could be and the user is more likely to grow bored or to lose concentration.

SUMMARY OF THE INVENTION

Accordingly, the invention is directed to providing an interactive book or device in which the mechanism that provides the sensory outputs maximizes the interaction between the user and the book or device both by increasing the number of different sensory outputs available to the user and by enabling the user to creatively combine those sensory outputs. For example, in one embodiment, when the book is opened, a page having visual indicia is exposed. Through the actuation of a function level selector, a function level corresponding to the exposed page is selected. That function level provides each of a set of function initiators with the capability of providing a unique sensory output which corresponds to one or more visual indicia on the selected page of the book. Each page represents a different function level. Therefore, for each page, a different sensory output is provided for each initiator which, in turn, leads to a different sensory output for each visual indicia on each page.

Furthermore, the mechanism can be configured such that the sensory outputs for each function level (i.e, each page) may be initiated sequentially to provide one cognizable aggregate output, according to the creativity of the user. For example, a page may be selected that has a function level (selected by actuating the function level selector) in which the sensory output provided by each of the function initiators is an audible reading of a word printed on the page. By actuating the function initiators in a particular sequence, the entire output can provide one cognizable output in the form of a sentence made up of words written on the page. Furthermore, depending on the creativity of the user, the sequence can be varied to provide any number of aggregate cognizable outputs.

The same concept can be applied to providing a cognizable output in the form of a melody generated from individual notes printed on the page. The user can initiate the sensory outputs to provide the melody printed on the page or initiate the outputs in a creative sequence and thereby generate a new melody.

By providing a mechanism that has different function levels according to the pages in the book, there are a greater number of sensory outputs available for the user to initiate. This also enables the user to create aggregate outputs. Consequently, the interaction of the user with the book is maximized.

DETAILED DESCRIPTION

Figure 1:
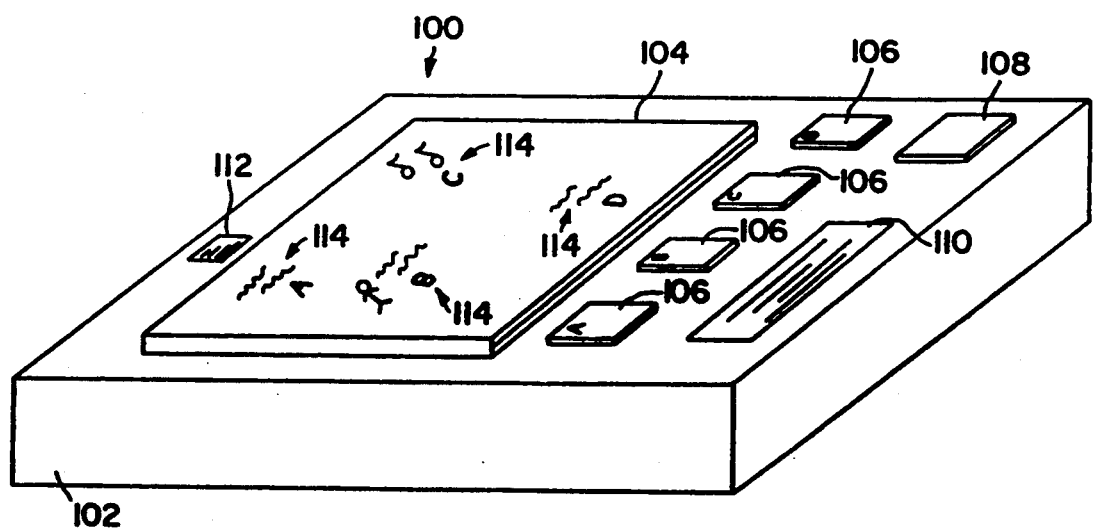
FIG. 1 is a schematic perspective view of an interactive book constructed according to the principles of the invention.
Figure 2:
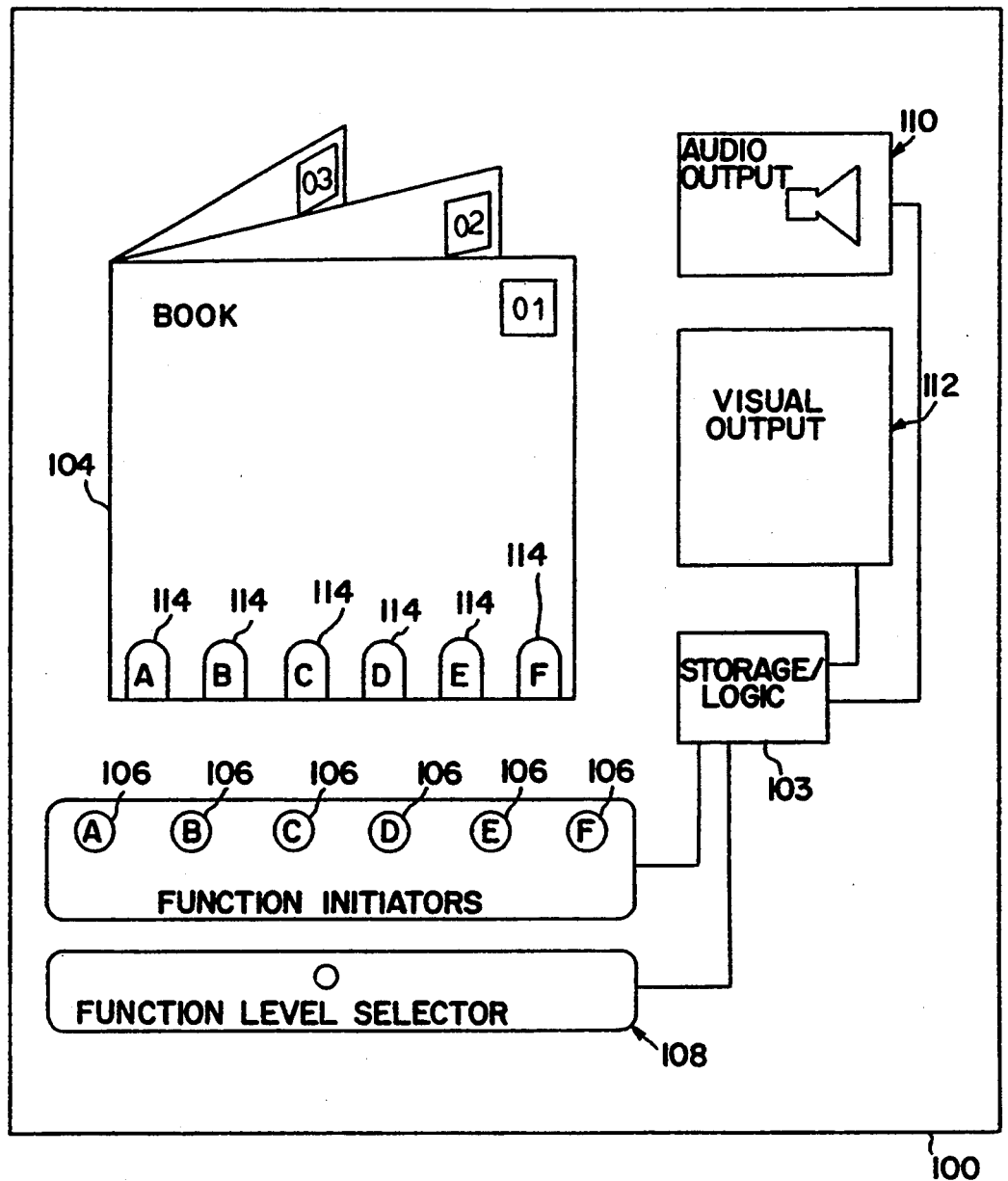
FIG. 2 is a block diagram of the interactive book of FIG. 1.

An interactive book 100 in accordance with the principles of the invention is shown schematically in FIG. 1 and in block diagram form in FIG. 2. The interactive book includes a base 102 on which is supported each of the components of the interactive book 100, including the pages of the book 104, a speaker 110, function initiator buttons 106, a function level selector 108 and a display 112 for showing the function level. The components of the interactive book 100 all being supported on the base 102 provides for an interactive book 100 that is compact and readily available for immediate use.

With reference to the block diagram in FIG. 2, the operation of the interactive book 100 is controlled with an electronic storage/logic chip 103 which provides electronic interface with the function initiator buttons 106, the function level selector 108, the visual output (display) 112 and the audio output (speaker) 110. Stored in the chip 103 are a plurality of function levels for the interactive book, there being one function level corresponding to each page of the book 104. Each function level provides each function initiator button 106 with the capability of initiating a unique sensory output (through the speaker 110) for that function level.

It will be appreciated that the sensory output need not be exclusively an audio output. It is contemplated that the sensory output could be a visual output, an audio output, a combination of an audio and visual output, or any other sensory output.

The selection of a particular function level is performed through actuation of the function level selector 108. With each actuation of the selector 108, the chip 103 will cause a change in the display 112 in a way that the user can determine which function level is currently selected. In operation, the user will initially open the book 104 to a particular page, for example, to page 1. The user will then actuate the function level selector 108 until the display indicates that the function level for page 1 is selected. Making reference then to the visual indicia 114 printed on page 1, the user then can initiate certain audio outputs (by actuating the function initiator buttons 106) that have correspondence to the visual indicia 114 on the page. For example, the visual indicia "A" could pertain to a certain word such that, upon actuating function initiator button "A", the chip 103 will send a signal to the speaker 110 that audibly states that particular word.

When finished with page 1, the user will move to a subsequent page, for example, to page 2, and will then actuate the function level selector 108 until the display 112 indicates that the function level for page 2 is selected. Upon selection of the level for page 2, the audio output for each function initiator button 106 is changed to now be relevant to the visual indicia 114 printed on page 2 instead of page 1. For example indicia "A" on page two could pertain to a certain musical note such that, upon actuation of function initiator button "A", the chip 103 will send a signal to the speaker 110 that plays that particular musical note.

On certain pages, each of the visual indicia 114 may correspond to a certain word such that when each of the words is strung together in a particular sequence a sentence is formed. Consequently, upon actuating the function initiator buttons 106 (for each visual indicia) in a particular sequence, an aggregate cognizable output can be obtained in the form of an audible sentence. In a configuration where the sensory output is visual instead of audio, the actual text may be shown on an LCD display.

An example of such a sentence could be "A Cat Sat On The Hat" where each of the six words in that sentence appear as a visual indicia 114 on the printed page and correspond to the sensory output of one of the function initiator buttons 106. Because each function initiator button 106 provides a sensory output of only one of the words in the sentence, the user may experiment with forming different sentences with those words by experimenting with different sequences of the function initiator buttons 106. For example, by creatively actuating the function initiator buttons 106, the user can create a sentence such as "On The Hat The Cat Sat" or "On The Cat Sat The Hat."

A similar capability is obtained for pages where the visual indicia 114 are musical notes. When each of the notes is strung together (by sequentially actuating the appropriate function initiator buttons 106) according to a particular sequence printed on the page, a melody is formed and can therefore be heard. However, the user can ignore the sequence suggested by the visual indicia 114 on the page and experiment at creating the user's own desired melodies.

In this connection, it will be appreciated that the sensory output for each function initiator need not be just one note but that it could be a combination of notes (e.g., a melody segment). Furthermore, some of the function initiators could be configured to play a note while others could be configured to produce sound effects such as animal noises or percussion instrument sounds. This gives even greater creative options to the user.

In FIGS. 1 and 2, the correspondence between the visual indicia 114 on the printed page and the function initiator buttons 106 is indicated through the use of letters (i.e. "A, B, C, etc."). However, the correspondence can also be obtained through the use of color coding whereby the color of the visual indicia 114 has the same color of the function initiator button 106 to which it corresponds. Similarly, the correspondence can also be obtained through the use of shape whereby the visual indicia 114 includes a figure that has the same shape as the function initiator button 106 to which it corresponds. Finally, the correspondence could be obtained through the use of any combinations of the above.

Similarly, a display 112 is not the only way the function level may be viewed. For example, the function level selector 108 could be configured to be a rotary knob whereby the function level is indicated by viewing the setting of the rotary knob. Another option is to configure the function level selector to be a multiple position switch whereby the function level is indicated by viewing the position of the switch.

Further features can be introduced to the interactive book to further encourage the interaction between the user and the book. Such features can include a logic function in the chip 103 that creates a game out of actuating the function initiator buttons 106. It can also include a logic function that creates a Question and Answer interaction between the book and the user. Furthermore, the relation between the visual indicia 114 and the function initiator buttons 106 can be supplemented by other sensory output buttons as well as a short term memory function that can repeat a previous sensory output. These and other features are described with reference to FIGS. 3-6.

Figure 3:
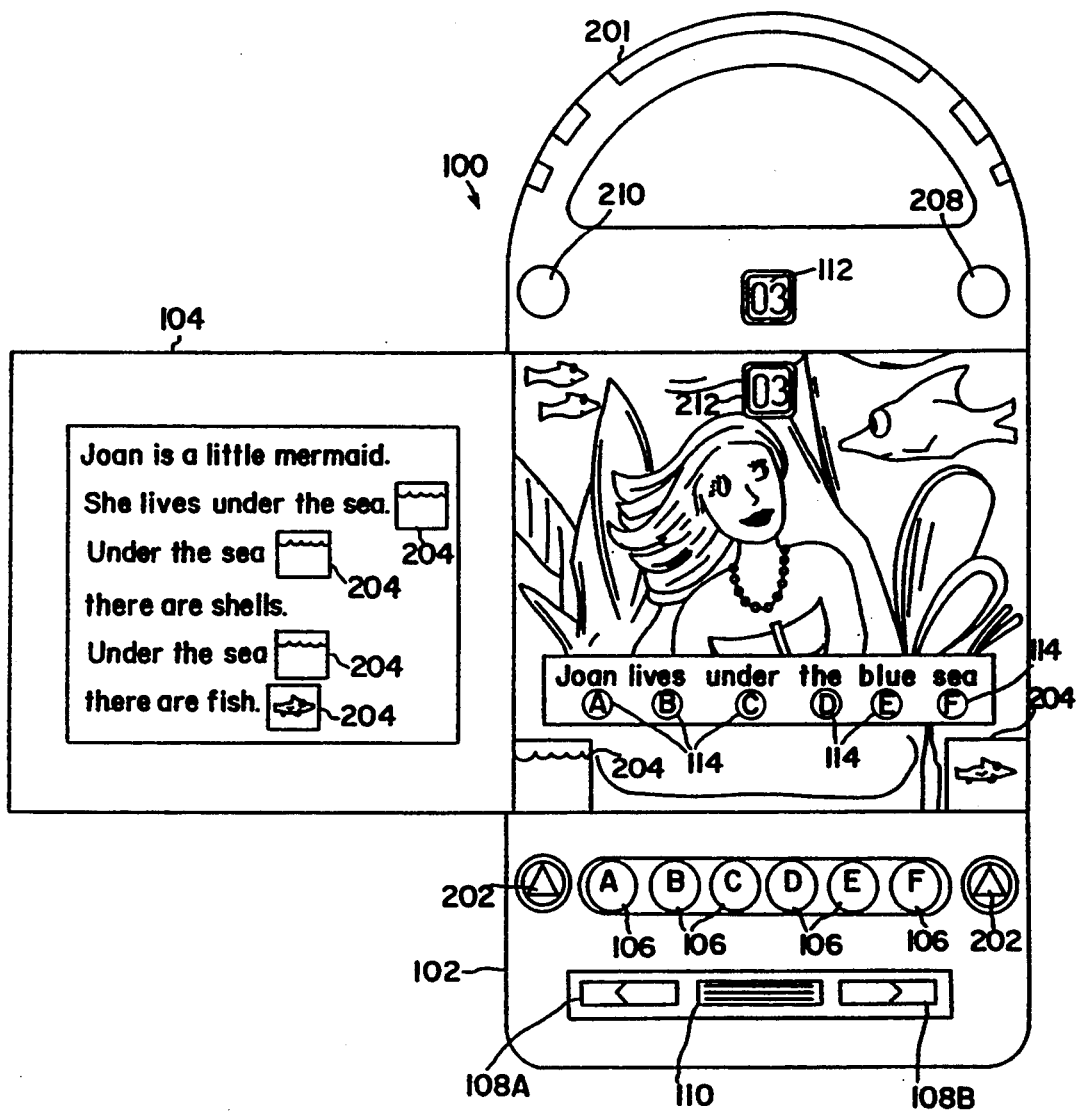
FIGS. 3-6 are plan views of four embodiments of interactive books with a particular page exposed.

Referring to FIG. 3, a first embodiment of an interactive book 100 is shown and includes a base 102 having rounded handle 201 fixed to the top for easy handling by the user. The book 104 is centrally mounted in the base 102 and is illustrated with cartoon characters along with visual indicia 114. In this case, each of the visual indicia corresponds to one word in the sentence, "Joan lives under the blue sea." The function initiator buttons 106 are located below the book 104.

The function level selector is separated into two buttons 108A, 108B, one for moving upward to a higher level, the other for moving downward to a lower level. The speaker 110 is mounted on the base 102 between the two function level selector buttons 108A, 108B.

The visual display 112 is mounted above the book 104 and comprises a conventional LCD device. The display indicates the function level that is selected which, in this case, corresponds to the page number 212 printed on the page of the book 104.

As shown in FIG. 3, function level 3 has been selected which corresponds to page 3 of the book 104. Consequently, by sequentially actuating the function initiator buttons 106 from left to right, the sentence "Joan lives under the blue sea" will be output from the speaker 110. The user can also experiment with different sequences to create different sentences. One example sentence that could be generated is "The Sea Lives."

To further enhance the interaction of the user and the book, a discrete memory is provided that will play back a preceding output. The content of that memory is played back by actuating a memory button 208 located at an upper right hand side of the base 102. The memory is cleared by actuating a memory clear button 210 located an upper left hand side of the base 102.

Also provided are two supplementary function initiator buttons 202 located on either side of the row of function initiator buttons 106. The left button 202 provides an audio output resembling the sound of the sea when depressed. The right button 202 provides an audio output resembling the sound of fish. The user is prompted to depress each of these buttons according to visual indicia 212 that appear after the lines of text on the left side of page 3. The visual indicia 212 also appears on the left half of page 3 immediately above the location of the supplementary buttons 202. These supplementary function initiator buttons 202 are also available to the user for introducing sound effects to new compositions created by the user.

Figure 4:
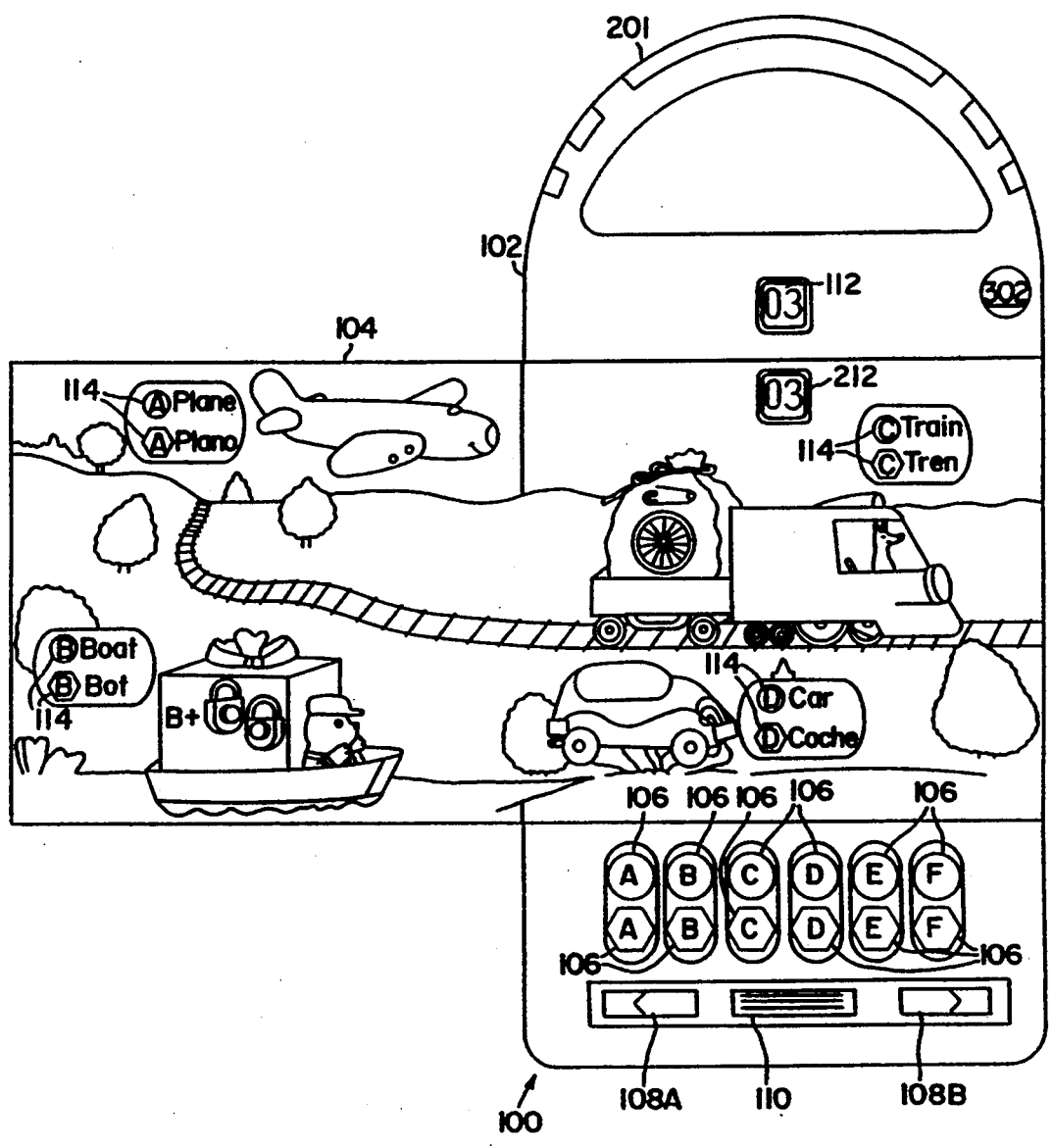

Referring to FIG. 4, a second embodiment of an interactive book 100 is shown and includes a book 104 that aids the user in learning words of different languages. The visual indicia 114 on the page shows the term of a particular object in two different languages, e.g., "Plane" (English) and "Plano" (Spanish). Furthermore, each term is shown to correspond to a particular function initiator button 106. Consequently, by pressing the corresponding function initiator button 106, the user can hear the pronunciation of the words for the particular object in two different languages.

It is noted that the indicia for showing the corresponding function initiator button 106 utilizes letter designation (i.e., "A", "B", etc.) in conjunction with shape (i.e., a circle and a hexagon). This designation corresponds to the actual shapes and letter of the buttons 106 themselves. It would also be possible to use color coding in combination with shape to achieve the appropriate designation.

In order to further enhance the interaction of the user and the book, interactive book 100 is provided with a game circuit that may be actuated by pressing a game initiation button 302 located at an upper right hand location of the base 102. Upon initiating the game circuit, a particular audio output corresponding to one of the terms printed on the page 104 will be played through the speaker 110. The user is then required to determine which term has been played and then press the function initiator button 106 that corresponds to it. The game circuit will indicate with another audio output whether the term that was selected was correct.

The interactive book of FIG. 4 has the same shape as the base of the interactive book shown in FIG. 3. The function level selector 108A and 108B, the visual display 112 and the page number 212 for the book is also the same as that for the interactive book of FIG. 3.

Figure 5:
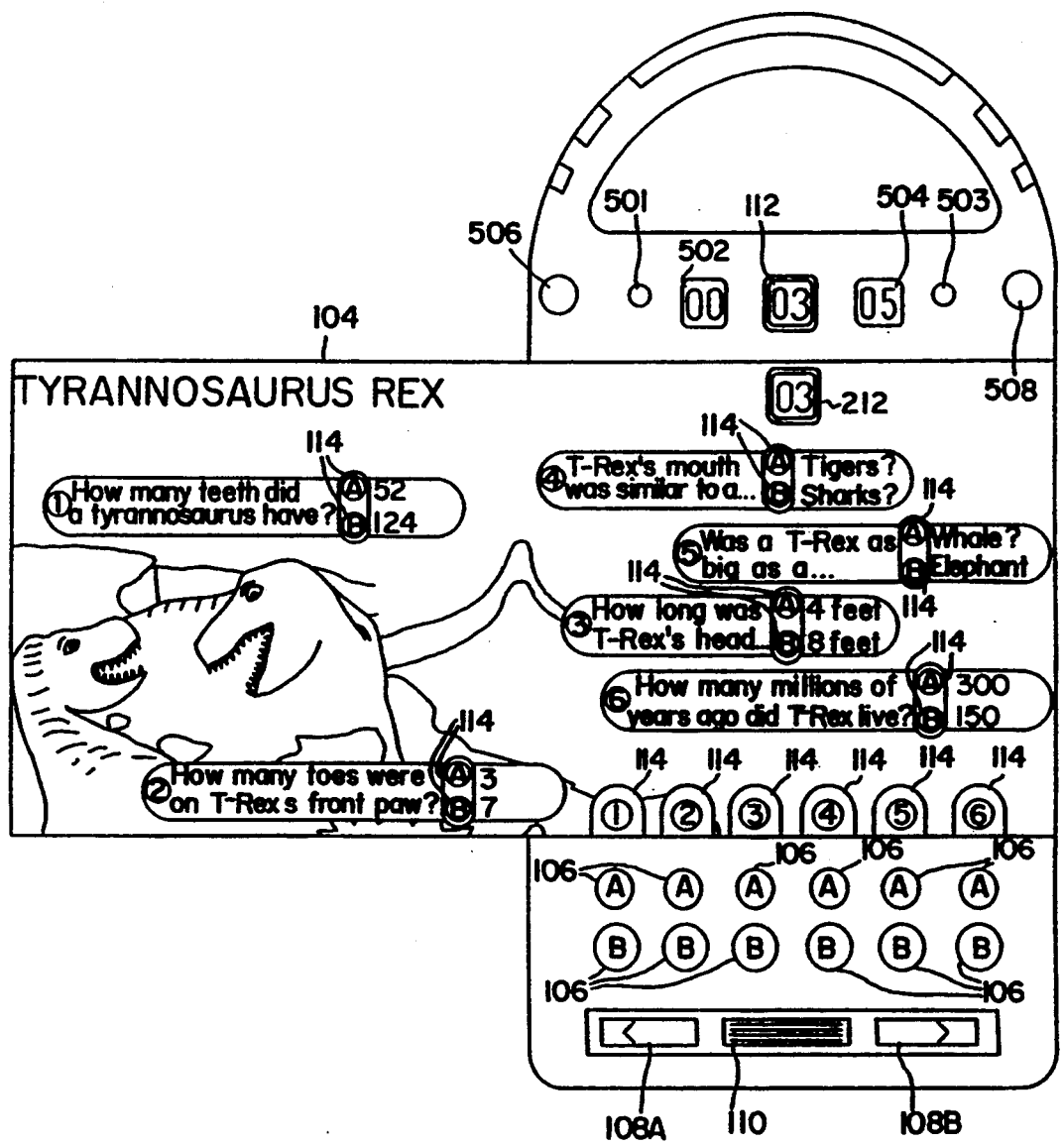

Referring to FIG. 5, a third embodiment of an interactive book 100 is shown which includes a book 104 with printed visual indicia that aid a user to learn certain facts on a particular topic. The visual indicia on page 3 are in the form of a series factual questions about the dinosaur "Tyrannosaurus Rex", the answers to which must be selected from two choices for each question. Each answer, A, B is shown to correspond to a particular function initiator button 106 for each question.

For example, for question number 1, "How many teeth did a tyrannosaurus have?", the user must choose between answers A, "52", or answer B, "124". The user looks to the bottom of the right half of page 3 to determine which function initiator buttons 106 correspond to question 1. The user than presses either the "A" button or the "B" button to indicate the chosen answer. If the answer is correct, an LED 502 located at the top of the base 102 illuminates. If the answer is incorrect, an LED 501, also located at the top of the base 102, illuminates. A different series of questions is provided on each page 104.

To enhance the interaction between the user and the interactive book 100, a game circuit is provided that will challenge the user's ability to answer the questions quickly. The game circuit incorporates a game switch 508 located at the upper right edge of the base 102, a countdown display 503 and a score display 504, both displays being located above the book 104 on either side of the visual display 112 for the function level.

Upon depressing the game switch 508, a timer will be initiated that counts down from 10 seconds to zero seconds. If the question is answered correctly within the first five seconds, the user scores 3 points. If the question is answered correctly within the second five seconds, the user scores 2 points. In the event the question is answered correctly after time has expired, only 1 points awarded. The score is indicated in the score display 504.

To further supplement the interaction between the user and the book, a supplemental sensory output button 506 is provided at an upper left edge of the base 102. Upon pressing this supplemental button, a sound effect may be initiated. An example output may be the spoken words "No Way" or "Far Out".

The interactive book of FIG. 5 has the same shape as the base of the interactive book shown in FIGS. 3 and 4. The function level selector 108A and 108B, the visual display 112 and the page number 212 for the book is also the same as that for the interactive book of FIGS. 3 and 4.

Figure 6:
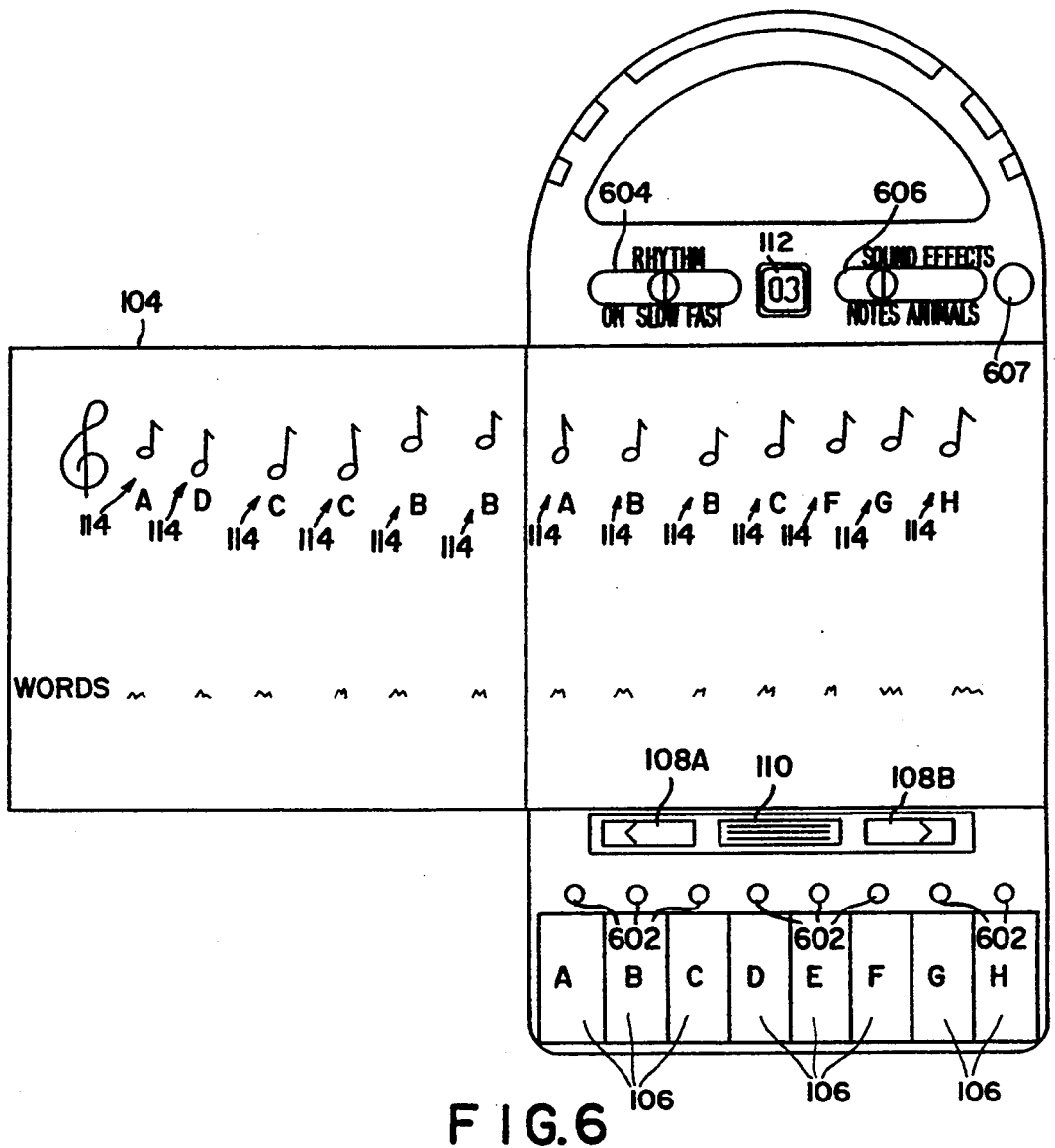

Referring to FIG. 6, a fourth embodiment of an interactive book 100 is shown and includes a book 104 with page 3 having visual indicia 114 in the form of printed musical notes of a particular melody. A letter, "A, B, C, ...", is printed near each musical note and corresponds to a particular function initiator button 106 having the same letter designation. Through actuating the function initiator buttons 106 in a sequence that follows the sequence of notes on the page, the melody is output through the speaker 110. A different melody is provided on each page and, therefore, for each function level. In addition to playing the melody on the printed page, the user may experiment in creating new melodies by simply pressing the function initiator buttons 106 in any desired sequence, much like playing a piano.

To enhance the interaction between the user and the book 104, several audio and visual features are provided. For example, by actuating an on/off button 607 located at an upper right edge of the base 102, a plurality of LED's 602, each of which correspond to a function initiator button 106, are sequentially illuminated. If the user actuates the function initiators according to the sequence shown by the illuminated LED's, the melody depicted on the page will be output. In that connection, a rhythm circuit is also provided whereby, according to the position of a rhythm switch 604, a fast or slow rhythm can be provided to aid in the playing of the melody.

The outputs through the speaker 110 are normally a simple musical tone. However, a sound circuit is provided whereby the musical tone can be changed to any melodic or sound effect variation which can then be combined to form a cognizable aggregate output. This is initiated by moving a sound effect switch 606 to a particular position. A particular animal sound may be chosen, for example, from a plurality of different animal sounds according to the position of the switch.

Although particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An apparatus comprising:
    means for storing a set of discrete sensory outputs;
    means for outputting each of said sensory outputs;
    a book having a plurality of pages, each of said pages including a plurality of visual indicia;
    a plurality of function initiators coupled to said output means, each of said function initiators initiating the output of a unique sensory output by said output means, each of said function initiators corresponding to at least one of said visual indicia, and all of said function initiators being physically distinct from all of said visual indicia;
    a function level selector coupled to each of said function initiators, said function level selector selectively changing a function level of the apparatus and thereby selectively changing the sensory output corresponding to each of said function initiators, each of said function initiators being associated with a different sensory output at each of said function levels; and
    a support member supporting said storage means, said output means, said plurality of function initiators, said function change selector and said book.

2. An apparatus according to claim 1, wherein said sensory output by said output means is an audio output.

3. An apparatus according to claim 2, wherein said audio output for each of said function initiators states a particular word.

4. An apparatus according to claim 3, wherein said audio outputs for said function initiators are sequentially combinable to form a cognizable phrase.

5. An apparatus according to claim 4, including at least one supplemental function initiator for initiating the generation of a sound effect output.

6. An apparatus according to claim 4, including a discrete memory for storing and selectively outputting at least one of a previous audio output.

7. An apparatus according to claim 3, wherein said particular word for at least one of said function initiators is in a language other than the English language.

8. An apparatus comprising:
    means for generating a plurality of sensory outputs;
    a book having a plurality of pages, each of said pages including a plurality of visual indicia;
    a plurality of function initiators coupled to said output generating means, each of said function initiators initiating the generation of a sensory output by said output generating means and each of said function initiators corresponding to at least one of said visual indicia;
    a function level selector coupled to each of said function initiators, said function level selector selectively changing a function level of the apparatus and thereby selectively changing the sensory output corresponding to at least one of said function initiators;
    a means for displaying said function level; and
    a support member supporting said output generating means, said plurality of function initiators, said function change selector and said book.

9. An apparatus according to claim 8, wherein said visual indicia include a plurality of written inquiries.

10. An apparatus according to claim 9, wherein at least two function initiators correspond to each written inquiry and wherein said sensory output for each of said at least two function initiators is an output responsive to the written inquiry.

11. An apparatus according to claim 10, wherein said sensory output for each of said at least two function initiators is one of a sensory output indicating a correct response to the written inquiry and a sensory output indicating an incorrect response to the written inquiry.

12. An apparatus according to claim 11, wherein said sensory output is a visual output.

13. An apparatus according to claim 11, including a selectively operable game circuit having a timer and scoring device, whereby points are accumulated by said scoring device according to each correct response to a written inquiry within a predetermined period of time as measured by said timer.

14. An apparatus according to claim 2, wherein said audio output for each of said function initiators is a musical note.

15. An apparatus according to claim 14, wherein said audio outputs for said function initiators are sequentially combinable to form a melody.

16. An apparatus according to claim 15, including a selectively operable game circuit for sequentially activating a plurality of visual output devices according to a predetermined pattern, each visual output device corresponding with at least one of said function initiators, whereby the sensory outputs for the function initiators will create a melody according to said predetermined pattern when said function initiators generate the sensory outputs following the sequential activation of the visual output devices.

17. An apparatus according to claim 16, including a selectively operable rhythm circuit for providing a rhythmic sensory output as a guide to the tempo of the created melody, said rhythmic sensory output being variable.

18. An apparatus according to claim 2, wherein said audio output for each of said function initiators is a sound effect.

19. An interactive book apparatus according to claim 1 further comprising;
    a combination memory for storing an ordered set of said sensory outputs, said ordered set being comprised of the sensory outputs associated with a set of selected function initiators on a selected one of said levels and being ordered in the order in which the function initiators are selected;
    a combination initiator for initiating the output of said ordered set of sensory outputs by said output means.

20. An interactive book apparatus according to claim 1 wherein each of said sensory outputs consists of an individual word, said words being combinable, at each of said levels, in multiple orders to form a plurality of phrases or sentences.

21. An interactive book apparatus according to claim 1 wherein said function initiators are grouped into a plurality of pairs of initiators, one of said initiators in each of said pairs initiating the output of a word or phrase by said output means in a first language, and the other of said initiators in each of said pairs initiating the output of the same word or phrase by said output means in a second language.

22. An interactive book apparatus according to claim 1 wherein each of said pages contains a plurality of questions, each of said visual indicia representing an answer corresponding to one of said questions and each of said sensory outputs indicating whether said visual indicia is a correct or an incorrect answer to said corresponding question.

23. An interactive book apparatus according to claim 22 further comprising:
   a timer circuit for specifying a counting of a specific period of time; and
   a scoring circuit for counting the number of function initiators, which correspond to said visual indicia which is a correct answer, initiated during said specific period of time.

24. An interactive book according to claim 1 wherein said sensory outputs are musical notes.

25. An interactive book apparatus comprising:
   a book having of a plurality of pages, each page including a plurality of visual indicia;
   means for storing a set of discrete sensory outputs;
   means for outputting said sensory outputs;
   a function level selector for selecting a function level of the apparatus;
   a support member supporting said book, said output means, said storage means, and said function level selector;
   a plurality of function initiators disposed on said support member adjacent said book, each of said function initiators corresponding to at least one of said visual indicia; and
   means supported by said support member and coupled to said storage means, said output means, said function level selector, and said function initiators for specifying one of said sensory outputs to be output by said output means in response to selection of one of said function initiators, said specified sensory output being different for each function level.

26. An interactive book apparatus according to claim 25 wherein each of said function levels correspond to a different one of said pages of said book.

27. An interactive book apparatus according to claim 25 further comprising a level indicator for displaying said function level.

28. An interactive book apparatus according to claim 25 wherein said function level selector comprises a pair of buttons, one for increasing and one for decreasing said function level.

29. An interactive book apparatus according to claim 28 wherein said level indicator is a digital display.

30. An interactive book apparatus providing sensory output for a user, said apparatus comprising:
   a memory for storing a set of discrete sensory outputs;
   means for outputting said sensory outputs;
   a plurality of switches, each of said switches corresponding to a plurality of said sensory outputs;
   a book having a plurality of pages, each page containing a plurality of visual indicia, each of said indicia uniquely corresponding to one of said switches;
   a level selector for selecting a logical level of the apparatus, each level corresponding to a different page of said book;
   a level indicator for providing visual feedback to the user of said logical level of the apparatus selected by said level selector;
   a logic unit coupled to said level selector, said memory, and said switches to select one of said plurality of sensory outputs corresponding to each of said switches to be output by said output means in response to selection of each of said switches by the user by pressing the switches; and
   a support member supporting said book, said memory, said level selector, said level indicator, said switches, said logic unit, and said output means.

31. An interactive book apparatus comprising:
   a book having a plurality of pages, each page having a plurality of visual indicia;
   means for outputting sensory outputs;
   a plurality of function initiators, each function initiator corresponding to one of said visual indicia;
   a logic memory means coupled to said function initiators and said output means for storing a plurality of sensory outputs and associating one of said sensory outputs to each of said function initiators to be output by said output means upon selection of each of said function initiator; and
   a function level selector coupled to said logic memory means for informing the logic memory means of the level of the apparatus, each of said pages defining a different level of the apparatus, and changing said association between said sensory outputs and said function initiators.

32. An interactive book apparatus according to claim 31 further comprising;
   a combination memory for storing an ordered set of said sensory outputs, said ordered set being comprised of the sensory outputs associated with a set of selected function initiators on a selected one of said levels and being ordered in the order in which the function initiators are selected;
   a combination initiator for initiating the output of said ordered set of sensory outputs by said output means.

33. An interactive book apparatus according to claim 31 wherein each of said sensory outputs consists of an individual word, said words being combinable, at each of said levels, in multiple orders to form a plurality of phrases or sentences.

34. An interactive book apparatus according to claim 31 wherein said function initiators are grouped into a plurality of pairs of initiators, one of said initiators in each of said pairs initiating the output of a word or phrase by said output means in a first language, and the other of said initiators in each of said pairs initiating the output of the same word or phrase by said output means in a second language.

35. An interactive book apparatus according to claim 31 wherein each of said pages includes a plurality of questions, each of said questions corresponding to a plurality of visual indicia indicating possible answers to said corresponding question.

36. An interactive book according to claim 35 wherein a sensory output indicating a correct response is associated with said function initiators corresponding to visual indicia which indicate a correct response to said corresponding question, and a sensory output indicating an incorrect response is associated with said function initiators corresponding to visual indicia which indicate the incorrect response to said corresponding question.

37. An interactive book according to claim 35 further comprising:
   means for measuring a specific period of time;
   means for counting the number of said function initiators corresponding to visual indicia which indicate the correct response to said corresponding questions are initiated during said period of time.

38. An interactive book according to claim 31 wherein each of said sensory outputs is one or more musical notes.

39. An interactive book according to claim 38 wherein said musical notes are combinable to create a melody.

40. An apparatus according to claim 39, including a selectively operable game circuit for sequentially activating a plurality of visual output devices according to a predetermined pattern, each visual output device corresponding with at least one of said function initiators, whereby the sensory outputs to the function initiators will create a melody according to said predetermined pattern when said function initiators generate the sensory outputs following the sequential activation of the visual output devices.

41. An apparatus according to claim 39, including a selectively operable rhythm circuit for providing a rhythmic sensory output as a guide to the tempo of the created melody, said rhythmic sensory output being variable.

42. An interactive book according to claim 38 further comprising a sound effect selector for modifying the sound of said musical notes without modifying the pitch of said musical notes.

43. An apparatus comprising:
   means for storing a set of discrete sensory outputs;
   means for outputting each of said sensory outputs;
   a book having a plurality of pages, each of said pages including a plurality of questions, a plurality of answers corresponding to each of said questions, and a plurality of visual indicia, each of said visual indicia corresponding to at least one of said answers, at least one of said sensory outputs being indicative of a correct answer, and at least one of said sensory outputs being indicative of a wrong answer;
   a plurality of function initiators coupled to said output means, each of said function initiators initiating the output of a sensory output by said output means, each of said function initiators corresponding to at least one of said visual indicia, and all of said function initiators being physically distinct from all of said visual indicia;
   a function level selector coupled to each of said function initiators, said function level selector selectively changing a function level of the apparatus and thereby selectively changing the sensory outputs corresponding to said function initiators, less then all of said sensory outputs being associated with function initiators at each of said levels; and
   a support member supporting said storage means, said output means, said plurality of function initiators, said function change selector and said book.

* * * * *